US010800364B2

(12) United States Patent
Khafagy et al.

(10) Patent No.: US 10,800,364 B2
(45) Date of Patent: Oct. 13, 2020

(54) VEHICLE POWER SUPPLY (71) Applicant: Ford Global Technologies, LLC, Dearborn, MI (US)

(72) Inventors: Hafiz Shafeek Khafagy, Dearborn, MI (US); Prasad Venkiteswaran, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 429 days.

(21) Appl. No.: 15/868,716

(22) Filed: Jan. 11, 2018

(65) Prior Publication Data

US 2019/0210547 A1    Jul. 11, 2019

(51) Int. Cl.
| *B60R 16/033* | (2006.01) |
| *H02M 3/02* | (2006.01) |
| *H02J 7/14* | (2006.01) |
| *B60R 16/03* | (2006.01) |
| *H02J 1/08* | (2006.01) |

(52) U.S. Cl.
CPC ............ *B60R 16/033* (2013.01); *B60R 16/03* (2013.01); *H02J 7/14* (2013.01); *H02M 3/02* (2013.01); *H02J 1/082* (2020.01)

(58) Field of Classification Search
USPC .................................. 307/9.1, 10.1
See application file for complete search history.

(56) References Cited

U.S. PATENT DOCUMENTS

| 6,909,201 | B2 | 6/2005 | Murty et al. |
| 7,950,606 | B2 | 5/2011 | Atkey et al. |
| 8,629,573 | B2 | 1/2014 | Winkler |
| 8,738,268 | B2 | 5/2014 | Karimi et al. |
| 9,653,965 | B2 | 5/2017 | Klemen et al. |
| 10,093,250 | B2* | 10/2018 | White ................ B60R 16/03 |
| 2002/0109406 | A1 | 8/2002 | Aberle et al. |
| 2002/0167291 | A1* | 11/2002 | Imai ................ H02J 7/0018 |
| | | | 320/119 |
| 2008/0215199 | A1 | 9/2008 | Aoyama et al. |
| 2009/0206660 | A1 | 8/2009 | Makita et al. |
| 2015/0148995 | A1 | 5/2015 | Scheffler et al. |
| 2019/0100111 | A1 | 4/2019 | Liu et al. |

FOREIGN PATENT DOCUMENTS

| CN | 104972913 B | 7/2017 |
| DE | 10020304 A1 | 10/2001 |
| DE | 19855245 B4 | 8/2010 |

OTHER PUBLICATIONS

Linear Technology article entitled "48V/12V Automotive Bidirectional Synchoronous Buck or Boost DC/DC Controller Increases Available Power," News Release www.linearcom, dated Sep. 20, 2016.
Non-Final Office Action dated May 12, 2020 re U.S. Appl. No. 15/868,695, filed Jan. 11, 2018.

* cited by examiner

*Primary Examiner* — Rexford N Barnie
*Assistant Examiner* — Xuan Ly
(74) *Attorney, Agent, or Firm* — Frank A. MacKenzie; Bejin Bieneman PLC (57) ABSTRACT A system includes first and second vehicle power distribution buses electrically isolated from one another, each electrically connected to an electric generator. Each of the first and second buses includes a high voltage portion, electrically connected to a first load with a power consumption exceeding a threshold, and a low voltage portion electrically connected to a second load with a power consumption less than the threshold.

7 Claims, 4 Drawing Sheets

VEHICLE POWER SUPPLY

BACKGROUND

Certain vehicle components rely on electrical power to operate properly. Examples of such components include electric motors, sensors, actuators, and electronic control units. Such electrical components include conductive material to allow a flow of electric current. Conductive materials in vehicle electrical components can add significant monetary costs and weight to a vehicle. Conductive material can consume considerable space in a vehicle.

DETAILED DESCRIPTION

Introduction

Disclosed herein is a system including first and second vehicle power distribution buses electrically isolated from one another, each electrically connected to an electric generator. Each of the first and second buses includes a high voltage portion, electrically connected to a first load with a power consumption exceeding a threshold, and a low voltage portion electrically connected to a second load with a power consumption less than the threshold.

The first load and the high voltage portion may be connected without a voltage reducing circuit.

The system may further include a first DC to DC converter electrically connecting the high voltage portion and the low voltage portion of the first vehicle power distribution bus, and a second DC to DC converter electrically connecting the high voltage portion and the low voltage portion of the second vehicle power distribution bus.

The system may further include a first battery electrically connected to the first vehicle power distribution bus, and a second battery electrically connected to the second vehicle power distribution bus.

The first DC to DC converter may include a first input terminal connected to a first DC power supply configured to supply a high voltage, and a first output terminal configured to supply a low voltage that is less than the high voltage, electrically connected to the first vehicle power distribution bus. The second DC to DC converter may include a second input terminal connected to a second DC power supply configured to supply the high voltage, and a second output terminal configured to supply the low voltage, electrically connected to the second vehicle power distribution bus.

The first and second DC power supplies may be electrically isolated DC generators.

The electrically isolated DC generators may be mechanically coupled.

The first load may include a device operational at the high voltage.

The second load may include a device operational at the low voltage.

Further disclosed is a computing device programmed to execute the any of the above method steps. Yet further disclosed is a vehicle comprising the computing device.

Yet further disclosed is a computer program product, comprising a computer readable medium storing instructions executable by a computer processor, to execute any of the above method steps.

System Elements

Figure 1:
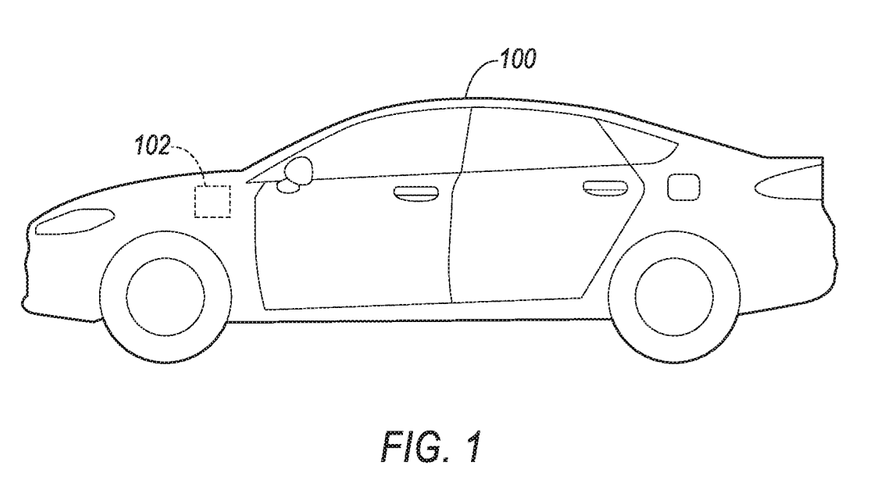
FIG. 1 illustrates an example vehicle including a vehicle system.

FIG. 1 illustrates a vehicle 100 with a power system 102. The vehicle power system 102 is typically necessary for the vehicle 100 to operate, e.g., accelerate, decelerate, steer, and brake. Although illustrated as a sedan, the vehicle 100 may include any passenger or commercial automobile such as a car, a truck, a sport utility vehicle, a crossover vehicle, a van, a minivan, a taxi, a bus, etc. In some possible approaches, the vehicle 100 is an autonomous vehicle that operates in an autonomous (e.g., driverless) mode, a partially or semi-autonomous mode, and/or a non-autonomous mode. For purposes of this disclosure, an autonomous mode is defined as one in which each of vehicle 100 propulsion, braking, and steering are controlled by a computer; in a semi-autonomous mode the computer controls one or two of vehicles 100 propulsion, braking; in a non-autonomous mode a human operator controls each of vehicle 100 propulsion, braking, and steering.

Figure 2:
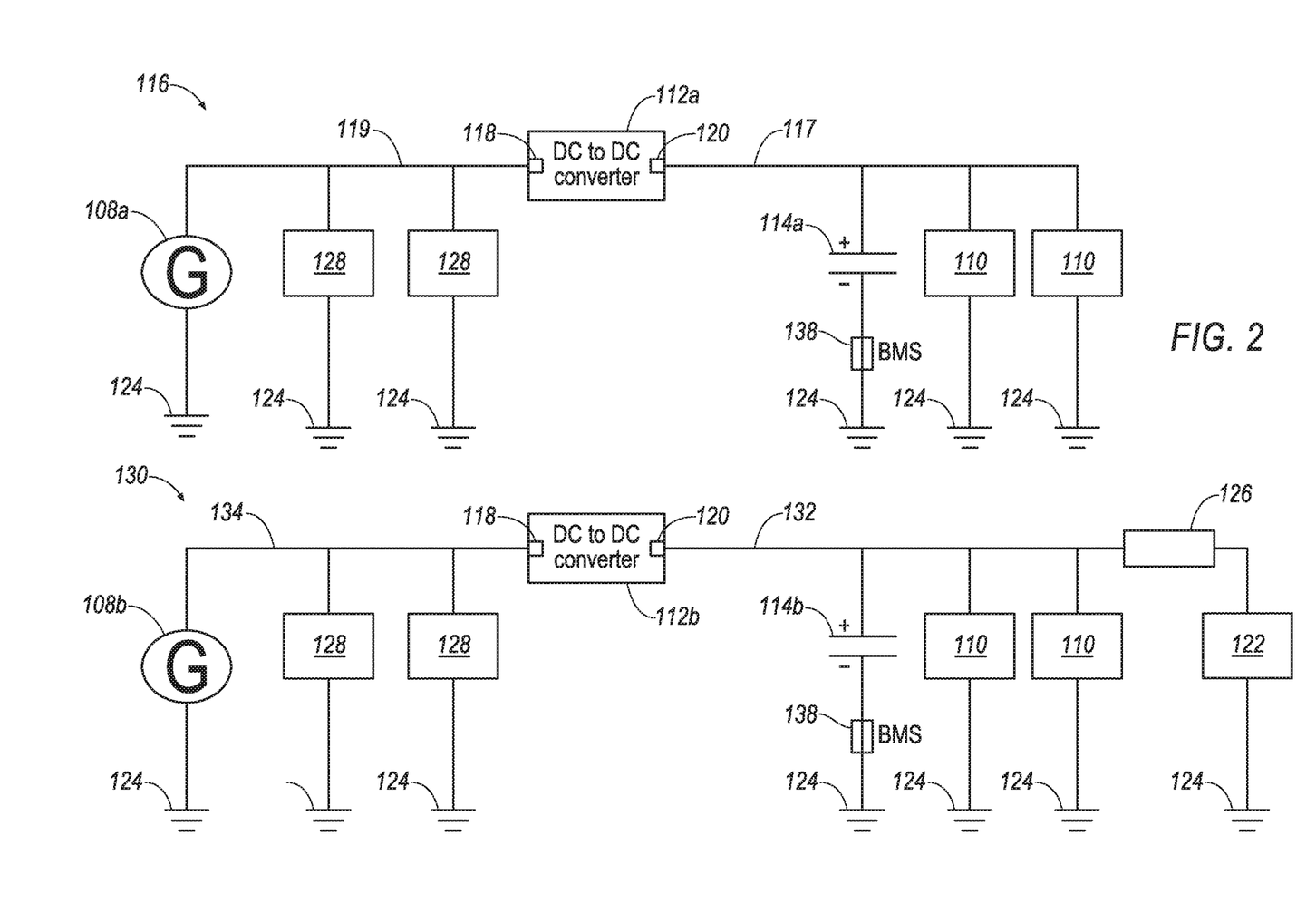
FIG. 2 illustrates an electrical schematic of the vehicle system incorporated in the vehicle.

Components of the vehicle power system 102 include a vehicle power generator 108a, 108b, DC (Direct Current)-DC converter 112a, 112b, the vehicle batteries 114a, 114b, and the vehicle power distribution buses 116, 130. The vehicle power distribution buses 116, 130 have low voltage 117, 132 and high voltage portions 119, 134. A power distribution bus 116, 130 is an electrical connection in the vehicle 100 for transferring electrical power. A power distribution bus 116, 130 may include a conductive material such as copper or aluminum and may be implemented as wires, plates, etc. Power distribution busses 116, 130 are typically covered with an insulator to electrically insulate the conductive material, e.g., copper, from other electrically conductive parts of the vehicle 100. In some instances, the power distribution buses 116, 130 may be bundled in a wire harness. The power distribution bus 116, 130 may include multiple conducting elements such as copper cables connected via junction elements, e.g., a copper plate connected to cables. In one possible approach, the conducting members such as copper wires included in a power distribution bus 116, 130 may be soldered to the copper plate and/or one another. Alternatively, the power junction element may refer to a conductive cable connector that can attach to a corresponding connector via, e.g., screws, as a part of a wire harness.

The power generator 108a, 108b, e.g., an alternator, converts mechanical energy to electrical energy. For example, the power generator 108a, 108b may convert mechanical energy from a rotating shaft into electrical energy. The electrical energy generated may be in the form of direct current (DC) energy or alternating current (AC) energy. Thus, in one possible approach, the power generators 108a, 108b in the vehicle power system 102 may be implemented as DC power generators 108a, 108b. If an AC power generator 108a, 108b is used, a rectifier circuit can be used to convert the alternating current generated into a direct current. In one example, the power generator 108a, 108b can be mechanically driven by an engine of the vehicle, e.g., a hybrid vehicle, and can generate a high AC voltage such as 300 VAC. The power generator 108a, 108b may include an inverter circuit which can convert the generated high voltage AC to a high DC voltage such as 48 VDC. The high voltage DC may then be fed to DC-DC converters 112*a*, 112*b*.

A load 110, 122, 128, in the context of this disclosure, is a vehicle 100 component that consumes electrical energy, e.g., electrical actuators(s), controller(s), sensor(s), etc. The loads 110 may include devices that draw power from the vehicle batteries 114*a*, 114*b*, the power generator 108*a*, 108*b*, etc. Examples of loads 110, 122, 128 may include electrical actuators, such as electrical motors, electrical heaters, etc., and electronic components, such as chips and sensors.

The loads 110, 122, 128 may be categorized according to a power consumption of the loads 110, 122, 128. For example, the loads 110, 122, 128 may be categorized as either a "high consumption" load 128 or a "low consumption" load 110, 122. In the present context, a high consumption load 128 is an electrical device with a power consumption exceeding a power threshold, e.g., 500 Watts (W), whereas a low consumption load 110, 122 is an electrical device with a power consumption that does not exceed the power threshold. For example, the high consumption loads 128 may include a windshield heater, a steering actuator, an electric motor, etc., whereas the low consumption loads 110 may include an electronic device such as a processor, a sensor, etc.

Additionally, a load 110, 122, 128 may be categorized according to how the load 110, 122, 128 contributes to the operation of the vehicle 100. For example, loads 110, 122, 128 may be categorized as either a "standard" load 110 or a "critical" load 110. A standard load 110 is typically a load 110 that is less critical to overall vehicle 100 operation. For example, a load to operate a climate control system is typically a standard load 110, 128 because, while important to occupant comfort, an air conditioner, for example, is typically not required to properly operate the vehicle 100. A critical load is a load 110, 128 supplied to carry out vehicle 100 operations required to operate the vehicle 100, e.g., propulsion, braking, and/or steering.

The DC-DC converters 112*a*, 112*b* are one type of electric power converter that can convert direct current (DC) energy from one voltage level to another. For example, a DC-DC converter 112*a*, 112*b* may convert a high DC voltage output by the vehicle power generator 108*a*, 108*b* to a low voltage DC for use by electronic components in the vehicle 100. The DC-DC converter 112*a*, 112*b* may have an input terminal 118 connected to, e.g., the power generators 108*a*, 108*b* via a power distribution bus high voltage portion 119, 134 and an output terminal 120 connected to a power distribution bus 116, 130 low voltage portion 117, 132. The DC-DC converters 112*a*, 112*b* may each further include a converter having power electronic components such as insulated-gate bipolar transistors (IGBT) and a control circuit. The control circuit may monitor operation of the converter and detect a malfunction in the DC-DC converter 112*a*, 112*b*. For instance, the control circuit may be programmed to detect a damaged power electronic component, disconnected or loose wiring to a DC-DC converter terminal, etc. Further, the DC-DC converter 112*a*, 112*b* may include a processor programmed to diagnose malfunctions in the DC-DC converter 112*a*, 112*b*, the control circuit, or both. The control circuits of the DC-DC converter 112*a*, 112*b* may communicate with another circuit through a communication interface that may allow that an external circuit, such a processor, to receive signals, such as a malfunction code, indicating internal information about the DC-DC converter 112*a*, 112*b*.

The vehicle batteries 114*a*, 114*b* are energy storage devices, such as absorbed glass mat (AGM) batteries. Each of the vehicle batteries 114*a*, 114*b* may operate at different voltage and/or power levels. For example, batteries 114*a*, 114*b* supplying power to electronic components of the vehicle 100 may have a nominal voltage of 12V DC. Each of the batteries 114*a*, 114*b* may have a ground pole connected through a ground line 124 to a metal body of the vehicle 100, and a positive pole connected to the power distribution bus 116, 130.

Each of the vehicle power distribution buses 116, 130 may include an overload protection circuit, e.g., a fuse, that shuts off the vehicle power distribution bus 116, 130 when a current consumption of the vehicle power distribution bus 116, 130 exceeds a predetermined threshold.

A flow of an electrical current I through a conductive material such as a wire, connector, winding of an electric motor, etc., generates (or dissipates) heat. In other words, the electrical energy may be converted at least partially to heat. An amount of the generated heat may be specified by a power (or heat power) P. The amount of the power P generated in a conductive material, e.g., a wire, may be determined based on the electrical current I that flows through the conductive material and an electrical voltage V, e.g., applied between two ends of the wire. The amount of power P may be determined based on equation (1) below. An amount of current flowing through a conductive material is based on the applied voltage V and an electrical resistance R of the conductive material, e.g., the wire, as shown in equation (2).

$$P = VI \qquad (1)$$

$$I = \frac{V}{R} \qquad (2)$$

As shown in equation (3), the electrical resistance R of, e.g., a wire, can be determined based on a length L, cross-sectional area A, and a resistivity ρ of the material from which the wire is formed of. The cross-sectional area A may be specified in a unit of square meter (m$^2$). Resistivity ρ is a material property that quantifies how strongly a material opposes the flow of an electric current I. The resistivity ρ may be specified in a unit of OhmMeters, e.g., $1.7 \times 10^{-8}$ Ohm Meters for copper.

$$R = \frac{\rho L}{A} \qquad (3)$$

The heat power P dissipated from a conductive material in a vehicle 100 may be a loss of the electrical energy or may be for heating a vehicle 100 component, e.g., windshield. For example, the heat dissipated from the wires, e.g., the power distribution buses 116, 130, while transferring electrical energy to the loads 110, 128, 122, may be referred to as a loss of electrical energy, whereas the heat dissipated from a heater such as windshield defroster may not be lost electrical energy because the heater operation includes dissipating heat to defrost a vehicle 100 window. The amount of dissipated heat is, as discussed above, based on the resistance R and the voltage V. The resistance R is, as discussed above, based at least in part on the cross-sectional area A, e.g., of the wire.

An amount of copper, aluminum, etc. used in the vehicle 100 to produce wires, heater conductors, motor windings, etc. is based on the cross-sectional area A. A weight, cost, and/or volume of conductor material used in a vehicle 100 decreases if a cross-sectional area A of the wires, etc. in the vehicle 100 can be decreased. In other words, where, as may be achieved herein, thinner wires, conducting paths, etc., can be used in the vehicle 100, a total amount of weight, cost, and/or volume of the conductive material, e.g., copper, aluminum, etc., in the vehicle 100 can be decreased.

To reduce the amount of conductive material used in a vehicle 100, the first and second vehicle power distribution buses 116, 130 may be electrically isolated from one another, each electrically connected to an electric generator 108a, 108b, wherein each of the first and second buses 116, 130 includes a high voltage portion 119, 134, electrically connected to a high voltage load 128 with a power consumption exceeding a threshold, e.g., 500 watts, and a low voltage portion 117, 132 electrically connected to a low voltage load 110 with a power consumption less than the threshold.

TABLE 1

| Comparison parameters | 12 V | 48 V |
|---|---|---|
| Supply voltage | 12 | 48 |
| Power to be dissipated across element (W) | 3000 | 3000 |
| Current through wire (A) | 250 | 62.5 |
| Resistance of wire (Ohm) | 0.048 | 0.768 |
| Resistivity of copper (Ohm. Meters) | 1.68E−08 | 1.68E−08 |
| Length L (meter) | 10 | 10 |
| Area A of wire for length L (mm$^2$) | 3.5 | 0.21875 |
| Volume (mm$^3$) | 0.035 | 0.0021875 |
| Weight (lb.) | 6.92E−07 | 4.32505E−08 |
| Reduction in weight | | 93.75% |

Table 1 shows an example comparison of weight reduction based on changing a supply voltage of a load 110, 128. Table 1 compares changes of cross-sectional area A and weight of a load 110, 128 when the heater is supplied by the high voltage of 48V instead of low voltage of 12V. For example, a windshield defroster may consume 3000 Watt to dissipate heat. In a first example, the windshield defroster may be a low voltage load 110 supplied by a low voltage, e.g., 12V, whereas in a second example the windshield defroster may be high voltage load 128 supplied by a high voltage, e.g., 48V. In either of the first and second examples, the windshield defroster consumes 3000 Watts. As shown in Table 1, a weight of the load 128 supplied by the high voltage may be 93.75% less than a weight of the load 110 supplied by the low voltage. Thus, advantageously, supplying a load that consumes a power more than the threshold, e.g., 500 Watts, may save in cost, weight, and volume of the conductive material. Similarly, a winding of an electric motor configured to be supplied by the high voltage may have a lower cost, weight, and/or volume compared to a motor with similar power that is configured (or designed) to be supplied with the low voltage. The power threshold, e.g., 500 Watts, may be specified based on volume and/or weight constraints of conducting material included in a vehicle 100.

As another advantage of supplying the high consumption loads with high voltage, an amount of electrical energy that needs to be converted by the DC to DC converters 112a, 112b may be reduced. For example, when a windshield defroster which consumes 3000 Watts is supplied by a power distribution bus 116, 130 high voltage portion 119, 134 instead of a low voltage portion 117, 132, then an output power of the DC to DC converter 112a, 112b may be reduced by 3000 Watts. Additionally, a reduction of power output of the DC to DC converter 112a, 112b may reduce a space used for cooling the DC to DC converter 112a, 112b circuits. For example, dimensions of a heat sink component included in a DC to DC converter 112a, 112b may be reduced based on reducing an output power of the DC to DC converter 112a, 112b. Additionally, a reduction of power output of the DC to DC converter 112a, 112b may reduce heat loss and cost of the DC to DC converter 112a, 112b.

In one example, the load 128 may be a load that has a distance to a vehicle 100 seat that exceeds a predetermined threshold, e.g., 1 m. Thus, advantageously, a likelihood of high voltage exposure to a vehicle 100 user may be reduced. For example, seat heating component may be supplied with low voltage although a power consumption of the seat heating component may exceed the power threshold.

The high voltage load 128 and the high voltage portion 119, 134 may be connected without a voltage reducing circuit such as a DC to DC converter. In other words, the high voltage load 128 is configured to be supplied by the high voltage, e.g., 48V. The high voltage load 128 may include a device operational at the high voltage, e.g., an electrical motor, heater, etc. The low voltage load 110 may include a device operational at the low voltage, e.g., a computer, a sensor, etc.

A vehicle 100 power supply generally should be resilient upon occurrence of safety-critical faults in order to ensure proper operation of the vehicle 100. Autonomous vehicles 100, including partially or semi-autonomous vehicles 100, typically have significantly higher electrical loads 110 than non-autonomous vehicles because autonomous and semi-autonomous vehicles 100 rely on more sensors and computing devices than their non-autonomous counterparts. Autonomous vehicles rely on power supplies to power those additional sensors and computing devices.

A power supply architecture of the vehicle 100 may be structured to tolerate certain failures, meaning that, even with a partial failure, the power supply allows the vehicle 100 to fulfil certain safety critical functionalities such as operating the vehicle 100 in a limp home mode. The term architecture in the present context includes the electrical components and a description of how they are electrically connected to one another. The limp home mode is a mode of operation in which the vehicle 100 operates at least partially to permit a vehicle 100 occupant to reach to a destination, e.g., a service center. In one example, the critical loads 110 may be redundant, e.g., a first and a second computer load 110 with same operation, e.g., steering. In one example, if the first computer load 110 fails to operate, the second computer load 110 may allow a vehicle 100 steering operation in the limp home mode.

The first and a second vehicle power distribution buses 116, 130 may be electrically isolated from one another. The first DC-DC converter 112a may be electrically connected to the first power distribution bus 116 and a second DC-DC converter 112b electrically connected to the second power distribution bus 130. The first DC to DC converter 112a may be electrically connecting the high voltage portion 119 and the low voltage portion 117 of the first vehicle power distribution bus 116. The second DC to DC converter 112b may be electrically connecting the high voltage portion 134 and the low voltage portion 132 of the second vehicle power distribution bus 130.

The vehicle can include a first battery 114a electrically connected to the first power distribution bus 116 low voltage portion 117, and a second battery 114b electrically connected to the second power distribution bus 130 low voltage portion 132.

A first input terminal 118 of the first DC to DC converter 112*a* may be connected, via the high voltage portion 119, to the first DC power generator 108*a* that generates electrical energy with a high voltage, e.g., 48 Volt DC. A first output terminal 120 of the first DC to DC converter 112*a* may output electrical energy with a low voltage, e.g., 12 Volt DC, less than the high voltage, e.g., 48 Volt DC, and can be electrically connected to the first vehicle power distribution bus low voltage portion 117. In other words, the DC to DC converters 112*a*, 112*b* may be configured to convert the high voltage, e.g., 48V, to the low voltage, e.g., 12V.

A second input terminal 118 of the second DC to DC converter 112*b* may be connected, via the second vehicle power distribution bus 130 high voltage portion 134, to the second DC power supply 108*b* that generates electrical energy with the first voltage, and a second output terminal 120 of the second DC to DC converter 112*b* may output electrical energy with the second voltage, and may be electrically connected to the second vehicle power distribution bus low voltage portion 132. Thus, the first and second DC power generators 108*a*, 108*b* may be electrically isolated. Alternatively, the vehicle power system 102 may include one DC power supply 108 that is electrically connected to the first and second DC to DC converters 112*a*, 112*b*. Thus, the first and second input terminals 118 of the first and second DC to DC converters 112*a*, 112*b* may be electrically connected to a single DC power generator.

Although, the first and second DC power generators 108*a*, 108*b* may be electrically isolated, the first and second DC power generators 108*a*, 108*b* may be mechanically coupled to one another. For example, each of the first and second DC power generators 108*a*, 108*b* may include power generators that are mechanically coupled to a vehicle 100 engine shaft. Thus, mechanical energy generated by the vehicle 100 engine may rotate a shaft of the power generators and generate electrical power.

A peak power consumption of the first vehicle power distribution bus 116 low voltage portion 117 may be at least equal to a sum of a first DC to DC converter 112*a* output power and a first battery 114*a* output power. Additionally or alternatively, a peak power consumption of the second vehicle power distribution bus 130 may be at least equal to a sum of a second DC to DC converter 112*b* output power and a second battery 114*b* output power.

"Electrical power" means a rate at which electric energy is transferred by an electric circuit. Electrical power may be specified in units of Watts (W). In the present disclosure, electrical power generated by, e.g., the DC power generators 108*a*, 108*b*, is referred to as output power, whereas electrical power consumed by, e.g., the loads 110, is referred to as consumed power or power consumption. A load 110 may have an average and a peak power consumption. The average power consumption is the electrical power that a load 110 consumes after ending an initialization time, e.g., 300 milliseconds. The initialization time, in the present context, is a duration of time elapsed since turning on the load 110 until the load 110 power consumption reaches the average power consumption. The peak power consumption is the electrical power that a load 110 consumes, e.g., during the initialization time, and/or other vehicle 100 operating conditions such as excessive acceleration, braking, etc. A peak power consumption may be several times more than the average power consumption.

The vehicle power system 102 may address the peak power consumption of the loads 110 by including DC power generators 108*a*, 108*b* that can output power equal to the peak power consumption and also by including DC to DC converters 112*a*, 112*b* that can convert and output electrical power equal to the peak power consumption of the loads 110. Thus, the DC power generators 108*a*, 108*b* and/or DC to DC converters 112*a*, 112*b* can output power equal to the peak power consumption, although that amount of power is typically needed only during peak power consumption period of the loads 110, 122, such as an initialization time, e.g., 300 ms. Physical dimensions and/or cost of the DC power generators 108*a*, 108*b*, and the DC to DC converters typically 112*a*, 112*b* increase based on an increase of their output power. Thus, physical dimensions and/or cost of the DC power generators 108*a*, 108*b*, and the DC to DC converters 112*a*, 112*b*, which can output power equal to the peak power consumption, are higher compared to the physical dimensions and/or cost of the DC to DC converters 112*a*, 112*b* and/or DC power generators 108*a*, 108*b* that can output power equal to the average power consumption of the loads 110. By including the first battery 114*a* that can output electrical power equal to or greater than a difference between the peak power consumption and the first DC power generators 108*a*, the first DC power generators 108*a* may be selected based on the average power consumption of the loads 110. In other words, the batteries 114*a*, 114*b* provide the additional power necessary during the peak power consumption period. After the peak power consumption period, the DC power generators 108*a*, 108*b* and DC to DC converters 112*a*, 112*b* can provide sufficient power to the loads 110.

As discussed above, the DC power generators 108*a*, 108*b* may be mechanically coupled to the vehicle 100 engine. Typically, a vehicle 100 with an engine includes a starter that is mechanically coupled to a vehicle 100 battery and cranks the vehicle 100 engine to start by consuming electrical energy from a vehicle 100 battery. In one example, the first DC power generator 108*a* may be a DC starter generator and the first DC to DC converter 112*a* may have a boost mode, in which the DC to DC converter transfers electrical energy from the first output terminal 120 to the first input terminal 118. In other words, the first DC to DC converter 112*a* may be configured to receive electrical energy from the first battery 114*a* and output electrical energy to the DC starter generator to start the vehicle 100 engine. Thus, the DC starter generator may operate in a starter mode to start the engine, i.e., operating as an electrical motor which converts electrical power to mechanical power to rotate the engine shaft to start the engine. Thus, advantageously, the vehicle 100 engine may be started without a battery electrically connected to the DC starter generator. This is beneficial, because a cost, weight, and/or dimensions of a battery increases based on the battery voltage. Therefore, starting the vehicle 100 engine based on electrical energy received from the first battery 114*a* with the second voltage, e.g., 12 Volt, is advantageous regarding saving space, weight, and/or cost.

As discussed above, the vehicle 100 may include the first and second computer loads 110 with the same operation, e.g., steering controller. If the first computer load 110 fails to operate and the second computer load 110 operates, then the vehicle 100 steering may still operate. However, if the first and second computer loads 110 are supplied by same power supply, then a failed power supply may lead to failure of the vehicle 100 steering operation. Therefore, in one example, the first and second computer loads 110 may be supplied by the first and second vehicle distribution buses 116, 130 respectively. Thus, advantageously, if, e.g., the first vehicle power distribution bus 116 fails to operate, then the second vehicle power distribution bus 130 may provide electrical energy to the second computer load 110 and may enable vehicle 100 steering to operate.

Figure 3:
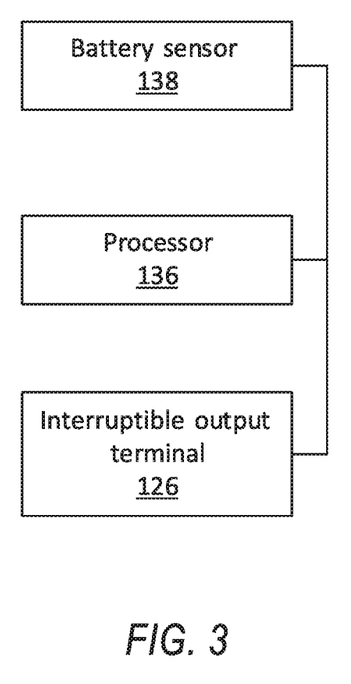
FIG. 3 is a block diagram control circuit for interruptible output terminal.

As discussed above, the vehicle power system 102 may include standard loads 110 and/or critical loads 110. For example, a load 110 for propulsion, steering, and/or braking operation may be critical, whereas a load 110 such as an air conditioner, seat heating, etc., may be standard (i.e., less critical). As shown in FIG. 3, the vehicle power system 102 may include a processor 136 and an interruptible output terminal 126 to control the supply of power to a standard interruptible load 122, e.g., an aftermarket refrigerator. The processor 136, the interruptible output terminal 126, and the battery sensor 138 may communicate with one another via, e.g., the vehicle 100 communication network, etc. With reference to FIGS. 2-3, the processor 136 may be programmed to shut off and/or turn on the interruptible output terminal 126, e.g., a relay, of the second vehicle power distribution bus 130 based on a current consumption of the second vehicle power distribution bus 130. The interruptible output terminal 126 may electrically couple the second vehicle distribution bus 130 to, e.g., a standard interruptible load 122.

A battery sensor 138 may be implemented as one or more sensors that provide precise current, voltage, and temperature measurements from the vehicle battery 114a, 114b. Battery monitoring sensors 138 may include a shunt resistor connected to a pole of the battery 114a, 114b. Electrical current supplied by the battery 114a, 114b flows through the shunt resistor. The sensor 138 may measure a voltage drop across the shunt resistor to measure the current supplied by (or output power of) the battery 114a, 114b. The battery sensor 138 may determine a temperature, health condition, etc., of the battery 114a, 114b based at least in part on the measured current amount. Battery sensors 138 may include a processor and a communication interface, e.g., to communicate via a vehicle 100 communications network such as a communications bus, a Local Interconnect Network (LIN), etc., to communicate with the processor 136. The processor 136 may be programmed to receive output power consumption of the DC to DC converter 112b, e.g., via the vehicle 100 communication network. The processor 136 may be programmed to determine the power consumption of the second vehicle power distribution bus 130 based on the received output power consumption of the DC to DC converter 112b and/or the received data from the battery sensor 138. For example, the processor 136 may be programmed to determine the power consumption of the second vehicle power distribution bus 130 based on an addition of the output power consumption of the DC to DC converter 112b and the measured output power of the battery 114b.

The processor 136 may be programmed to shut off the interruptible output terminal 126 upon determining that the second vehicle distribution bus 130 current consumption exceeds a first threshold, e.g., 90% of the specified peak current consumption of the second vehicle power distribution bus 130. For example, the second vehicle power distribution bus may have a peak power consumptions of 100 Ampere (A), and the processor 136 may be programmed to turn off the interruptible output terminal 126 when the power consumption of the second vehicle distribution bus 130 exceeds the first threshold, e.g., 90 A (i.e., 90% of 100 A). The processor 136 may be programmed to determine the current consumption of the second vehicle distribution bus 130 based on data received from a battery sensor 138.

Additionally or alternatively, the processor 136 may be programmed to shut off an interruptible output terminal 126 electrically connected to the first vehicle power distribution bus 116.

Additionally or alternatively, the processor 136 may be programmed to shut off the interruptible output terminal 126 upon detecting a fault condition. A fault (or fault condition) is a condition in which a component fails to operate or operates outside of one or more predefined parameters (e.g., a predefined parameter could be a physical quantity such as electric current, electric power, electric voltage, temperature, etc.) Thus, advantageously, shutting off the standard interruptible load 122 may prevent an interruption of supplying power to the critical loads 110. For example, the processor 136 may be programmed to shut off the interruptible terminal 126 upon determining that the DC to DC converter 112b is overheated, e.g., a temperature of electrical components inside the DC to DC converter 112b exceeded a predetermined threshold, e.g., 100 degrees Celsius. In one example, turning off the interruptible terminal 126 reduces a consumed electric power of the second vehicle distribution bus 130 and may prevent a failure of the DC to DC converter 112b. Thus, advantageously, an interruption of supplying power to critical loads 110 may be prevented.

As discussed above, peak power consumption of loads 110, e.g., during initialization time, contribute to the peak power consumption of the vehicle distribution bus 130. Thus, advantageously, tuning off the interruptible output terminal 126 may help to achieve that the power consumption of the second vehicle power distribution bus 130 is maintained below the peak power consumption of the second vehicle distribution bus 130. Further, turning off the interruptible output terminal 126 may prevent a discharge of power from the battery 114b which may extend a useful life of the battery 114b. As discussed above, the battery 114b may supply the electric power (i.e., operating in a discharge mode in which the battery 114b outputs electric power) when the power consumption of the second vehicle distribution bus 130 exceeds the second DC to DC converter 112b output power. Each change of operation of the battery 114b between discharge mode and charge mode (i.e., being charged by the second DC to DC converter 112b) is referred to as a cycle. An increase of a number of battery 114b cycles may reduce the useful life of the battery 114b.

The processor 136 may be programmed to turn on the interruptible output terminal 126 upon determining that the power consumption of the second vehicle power distribution bus 130 is below a second threshold, e.g., 105% of the average power consumption of the second vehicle distribution bus 130 including an average power consumption of the loads 110 and the standard interruptible load 122. For example, the second vehicle power distribution bus 130 may have an average power consumption of 40A, and the processor 136 may be programmed to turn on the interruptible output terminal 126 upon determining that the power consumption of the second vehicle distribution bus 130 is less than the second threshold, e.g., 42A (i.e., 105% of 40A).

Process Flow

Figure 4:
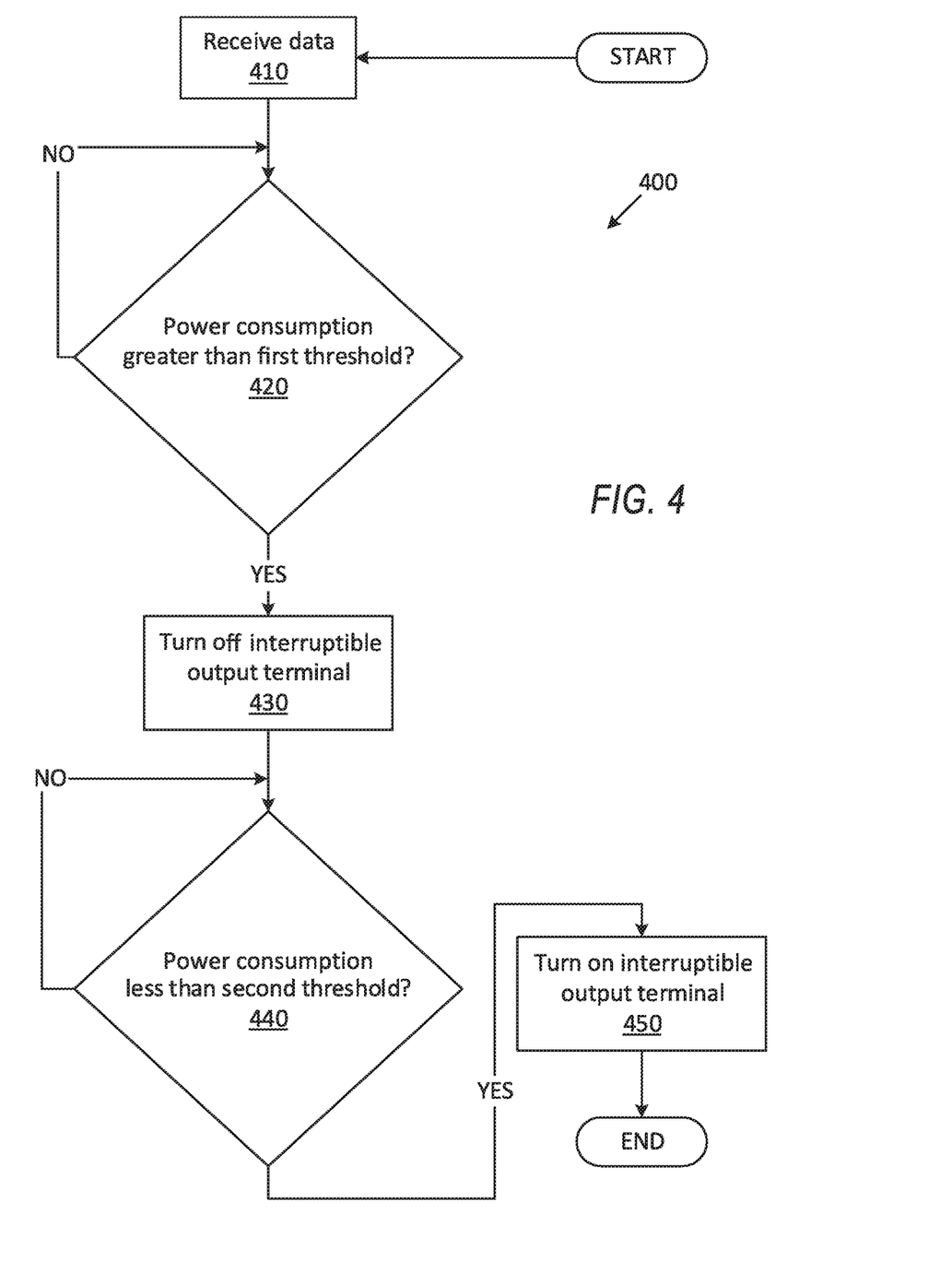
FIG. 4 is a flowchart of an example process for controlling an interruptible output terminal of a vehicle power supply.

FIG. 4 is a flowchart of an example process 400 for controlling an interruptible output terminal 126 of a vehicle power supply. For example, the processor 136 may be programmed to execute blocks of the process 400 to control the interruptible output terminal 126.

The process 400 begins in a block 410, in which the processor 136 receives data, e.g., from the battery sensors 138. The processor 136 may be programmed to receive data including current power consumption, health condition, etc., of the second vehicle power distribution bus 130 from the battery sensor 138. The processor 136 may be programmed to receive data from the DC-DC converter 112b including the output power of the DC-DC converter 112b, e.g., via a vehicle 100 communication network. The processor 136 may be programmed to determine the power consumption of the second vehicle power distribution bus 130 based on the received data from the battery sensor 138, the DC-DC converter 112b, and/or data stored in the processor 136 memory such as a peak power consumption of the standard interruptible load 122.

Next, in a decision block 420, the processor 136 determines whether the power consumption of the second vehicle distribution bus 130 exceeds the first threshold, e.g., 90% of the peak power consumption of the loads 110, 122. If the processor 136 determines that the power consumption of the second vehicle distribution bus 130 exceeds the first threshold, then the process 400 proceeds to a block 430; otherwise the process 400 returns to the decision block 420.

In the block 430, the processor 136 turns off the interruptible output terminal 126. The processor 136 may be programmed to actuate the interruptible output terminal 126 to turn off, i.e., disconnect the second vehicle power distribution bus 130 from the standard (less critical) interruptible load 122.

Next, in a decision block 440, the processor 136 determines whether the power consumption of loads 110 connected to the second vehicle power distribution bus 130 is less than the second threshold, e.g., 105% of the average power consumption of the loads 110 supplied by the second power distribution bus 130. If the processor 136 determines that the power consumption is less than the second threshold, then the process 400 proceeds to a block 450; otherwise the process 400 returns to the decision block 440.

In the block 450, the processor 136 turns on the interruptible output terminal 126. The processor 136 may be programmed to actuate the interruptible output terminal 126 to turn on, i.e., supplying power to the standard (less critical) interruptible load 122.

Following the block 450, the process 400 ends, or alternatively returns to the block 410, although not shown in FIG. 4.

Unless indicated explicitly to the contrary, "based on" means "based at least in part on" and/or "based entirely on."

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system comprising:
    first and second vehicle power distribution buses electrically isolated from one another, each electrically connected to an electric generator, wherein each of the first and second buses includes a high voltage portion, electrically connected to a first load with a power consumption exceeding a threshold, and a low voltage portion electrically connected to a second load with a power consumption less than the threshold;
    a first DC to DC converter, electrically connecting the high voltage portion and the low voltage portion of the first vehicle power distribution bus, including:
        a first input terminal connected to a first DC power supply configured to supply a high voltage; and
        a first output terminal configured to supply a low voltage that is less than the high voltage, electrically connected to the first vehicle power distribution bus; and
    a second DC to DC converter, electrically connecting the high voltage portion and the low voltage portion of the second vehicle power distribution bus, including:
        a second input terminal connected to a second DC power supply configured to supply the high voltage; and a second output terminal configured to supply the low voltage, electrically connected to the second vehicle power distribution bus.

2. The system of claim 1, wherein the first load and the high voltage portion are connected without a voltage reducing circuit.

3. The system of claim 1, further comprising:
a first battery electrically connected to the first vehicle power distribution bus; and
a second battery electrically connected to the second vehicle power distribution bus.

4. The system of claim 1, wherein the first and second DC power supplies are electrically isolated DC generators.

5. The system of claim 4, wherein the electrically isolated DC generators are mechanically coupled.

6. The system of claim 1, wherein the first load includes a device operational at the high voltage.

7. The system of claim 1, wherein the second load includes a device operational at the low voltage.

* * * * *